United States Patent
Lautenschlager et al.

(10) Patent No.: US 6,333,972 B1
(45) Date of Patent: Dec. 25, 2001

(54) SERVICE FOR CENTRAL NETWORK OPERATOR ALLOCATION OF MALFUNCTION REPORTS IN A MULTI-OPERATOR ENVIRONMENT

(75) Inventors: Wolfgang Lautenschlager, Weissach-Flacht; Heinz Stürz, Dresden, both of (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/266,796

(22) Filed: Mar. 12, 1999

(30) Foreign Application Priority Data

Mar. 12, 1998 (DE) ................................ 198 10 626

(51) Int. Cl.$^7$ .................................... H04M 1/24
(52) U.S. Cl. .................. 379/9.03; 379/9.02; 379/15.05
(58) Field of Search .............................. 379/34, 1, 9, 10, 379/11, 32, 112, 113, 27, 29, 13, 27.01, 1.01, 9.02, 9.04, 15.02, 15.04, 22.03, 29.09, 32.01, 32.02, 32.03, 32.04

(56) References Cited

U.S. PATENT DOCUMENTS

| | | | |
|---|---|---|---|
| 5,297,193 | * 3/1994 | Bouix et al. | 379/32 |
| 5,652,787 | 7/1997 | O'Kelly . | |
| 5,692,030 | 11/1997 | Teglovic et al. . | |
| 5,715,394 | 2/1998 | Jabs . | |
| 5,748,710 | 5/1998 | Lautenschlager . | |
| 5,881,131 | * 3/1999 | Farris et al. | 379/27 |

FOREIGN PATENT DOCUMENTS 195 35 540
 C1   12/1996  (DE) .

OTHER PUBLICATIONS

Shaygan Kheradpir et al "Managing the Network Manager", IEEE Communications Magazine, Jul. 1992, pp. Mar. 12, 1999–21.

* cited by examiner

Primary Examiner—Binh Tieu
Assistant Examiner—Rexford N Barnie
(74) Attorney, Agent, or Firm—Sughrue Mion, PLLC

(57) ABSTRACT

In a method for the central processing of malfunction reports in a telecommunications (TK) network with a plurality of sub-networks (1, 2) of different network operators (A, B), at least one IN (Intelligent Network) service (8) is established which can be activated by dialing a malfunction dial number from any network connection (3, 4), which upon receipt of a malfunction report, independent of the connection (4) that dispatches the malfunction report, determines to which connection dial number this malfunction report relates, which from the connection dial number thus established determines the network operator (A) to whose sub-network (1) the corresponding malfunctioning connection (3) belongs, and which delivers the malfunction call to the responsible network operator (A). This permits a simple allocation of calls reporting malfunctions in a multi-operator environment to the respectively responsible network operator, whereby the affiliation of a TK subscriber with a specific network operator is not evident from his dial number and the malfunction may also be reported from a connection other than the malfunctioning connection involved.

19 Claims, 1 Drawing Sheet

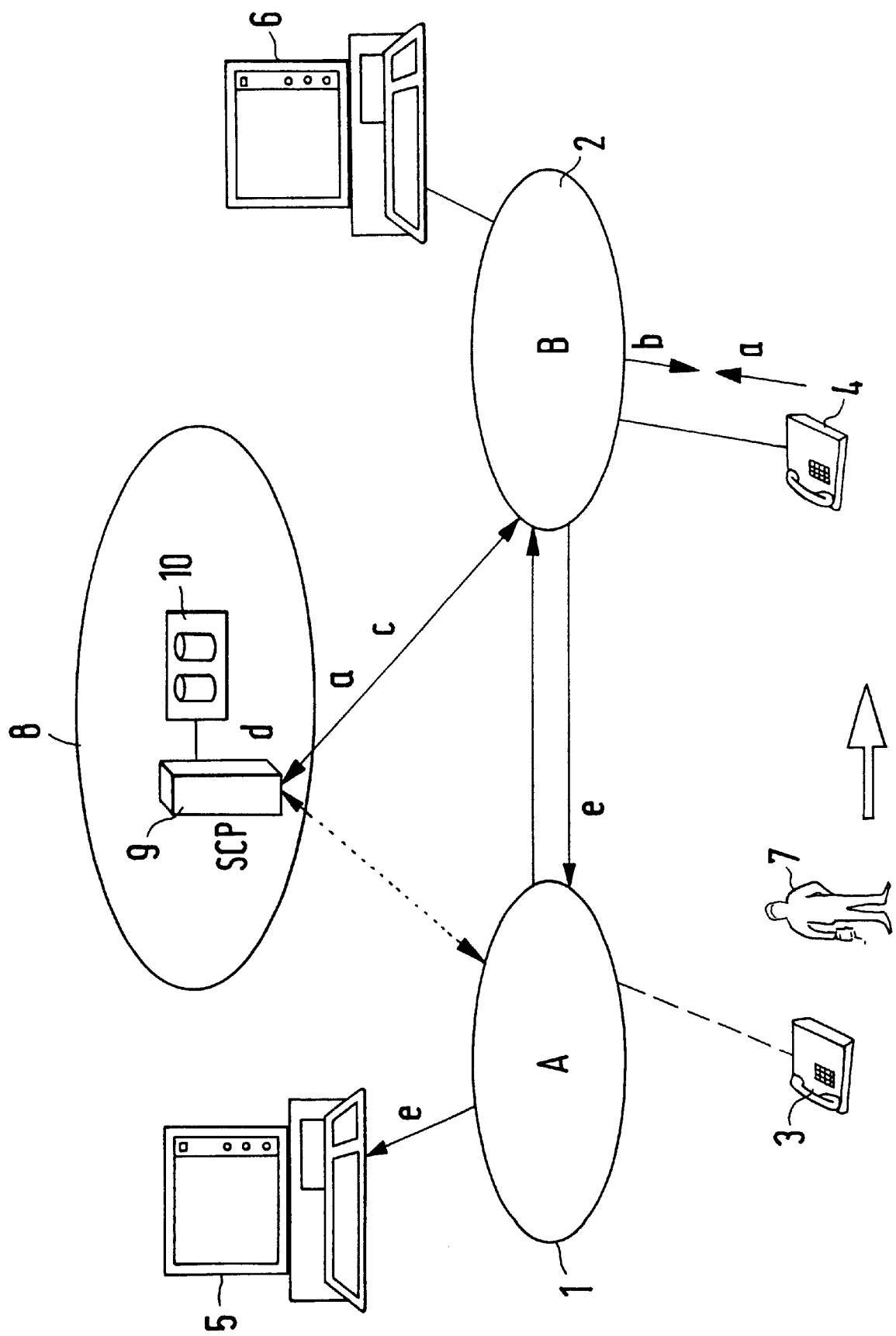

SERVICE FOR CENTRAL NETWORK OPERATOR ALLOCATION OF MALFUNCTION REPORTS IN A MULTI-OPERATOR ENVIRONMENT

BACKGROUND OF THE INVENTION

This application is based on and claims the benefit of German Patent Application No. 198 10 626.2 filed Mar. 12, 1998, which is incorporated by reference herein.

The invention relates to a method for allocating malfunction reports to the involved network operator in a telecommunications (TK) network with a plurality of sub-networks operated by different network operators in a multi-operator environment.

In countries with a telecommunications monopoly, a uniform dial number with subsequent user guidance and allocation to the respective department of the monopolist is currently offered. In Germany today, for example, Deutsche Telekom (DT AG) has a malfunction reception department for malfunctions in its network. This reception department forwards malfunction reports to the corresponding offices which isolate, determine and correct the malfunctions. All offices, however, are located within one company, in this example within DT AG.

Liberalization of the telecommunications market is now leading to a plurality of network operators competing within a telecommunications network. Furthermore, the affiliation of a TK subscriber with a specific network operator in a future "German fixed network", which will include several network operators, will no longer be identifiable from the dial number alone. Even if dial number blocks were to be allocated to the network operators, a specific subscriber could still be a ported subscriber.

In case of a malfunction, it is easily possible that a TK subscriber wants to, or has to, use a third party connection to report a malfunction in his own connection. It is also possible that a TK subscriber wants to report the malfunction of a third party connection which may be very remote from his own. In case of a third party connection, however, the probability increases that the connection falls into the area of a different network, operator. In this case, the TK subscriber reporting the malfunction would generally not have the dial number available for the respective malfunction reception point of the specific sub-network.

Furthermore, the "third party network operator" is not interested in processing a malfunction report at no charge for another network operator and is very rarely in a position to do so.

SUMMARY OF THE INVENTION

Thus, the object of the present invention is to make possible a simple allocation of calls reporting malfunctions in a multi-operator environment to the respective responsible network operator, whereby the affiliation of the TK subscriber with a specific network operator is not identifiable by his dial number and whereby the malfunction can also be reported from a connection other than the malfunctioning connection involved.

According to the invention, this object is attained by a method having the initially stated characteristics, whereby at least one IN (Intelligent Network) service is established which can be activated by dialing a malfunction dial number from any network connection and which, on receipt of the malfunction report and independent of the connection dispatching the malfunction report, determines what connection dial number the malfunction report refers to, determines from the established connection dial number the network operator to whose sub-network the corresponding malfunctioning connection belongs and delivers the malfunction call to the responsible network operator.

As a result, each network operator can create its own malfunction reception point for its own sub-network which can be reached without problems from the entire TK network.

Particularly preferred is a variant of the inventive method, wherein a central IN service is established in the TK network for central allocation of incoming malfunction reports to the respective responsible operator of the sub-network to which the malfunctioning connection belongs. This eliminates the necessity for each subnetwork operator to maintain a corresponding IN service in its own respective subnetwork.

DE 43 21 458 A1 discloses a method for supporting network management for a plurality of autonomous communications networks, wherein the network operators can retrieve status information, e.g., regarding faults occurring in network components, from a central point. This central network management unit, however, can only be reached centrally by the operators themselves, not by the subscribers connected to the TK network who may, for example, want to report a malfunction.

DE 195 35 540 C1 describes a method for processing incoming calls in a communications system with automatic call distribution, where calls are to be switched to free agent communications terminals of different service provider groups. However, the problems of a TK network comprising a plurality of sub-networks with different network operators are not discussed, particularly not a central allocation of malfunction reports in a multi-operator environment such as is made possible by the inventive method.

Particularly advantageous is a variant of the inventive method, in which a subnetwork independent malfunction dial number, which is uniform for all network operators, activates the IN service. This makes it possible to offer a central, easily memorized malfunction dial number which is identical for the entire area of the TK network and for all connected users—comparable to the uniform "110" emergency number used in Germany—and which each TK subscriber can have ready without having to resort to additional information services or telephone books.

This variant of the method can be modified by differentiating the uniform malfunction dial number by a special identification digit or digit group according to specific user groups, for example, business customers or private customers. Thus, all subscribers connected to the entire area of the telecommunications network belonging to a specific group can report any malfunctions by using the same malfunction dial number.

A further possible development is that the uniform malfunction dial number is differentiated by a special identification digit or digit group according to specific modalities, e.g., day or night inquiry.

This makes it possible to respond to the particular characteristics of individual groups of cases, e.g. by providing different sub-areas of the IN service to permit the individual and thus possibly faster processing of cases with the end result that the respective malfunction can be corrected very quickly.

Also particularly preferred is a variant of the inventive method, wherein the IN service, upon activation, initiates an automatic announcement that is played to the TK subscriber dispatching the malfunction report sand prompts him to identify the dial number of the malfunctioning connection. From DE 195 32 490 A1, a method is known per se for providing service announcements in a communications network, wherein all the announcements allocated to a service are stored in the associated service logic and upon activation of the service are loaded to the corresponding service support system. If a service requires an announcement, that announcement is activated by means of a special message from the service control point. This permits, together with the service logic, the central administration of announcements and texts by the service provider.

Particularly convenient for the calling TK subscriber is a further development of this variant of the method, wherein a computer-supported voice recognition device is activated together with the automatic announcement, which determines the dial number of the malfunctioning connection from the answers of the reporting TK subscriber.

Alternatively thereto, the announcement may also prompt the reporting TK subscriber to enter the dial number of the malfunctioning connection through the keypad of his TK terminal, which again permits the automatic recording of the dial number of the malfunctioning connection by the IN service.

It is also advantageous if the reporting TK subscriber can inform the IN service, either through voice input or defined actuation of the keypad of his TK terminal, whether the malfunction report refers to the TK connection currently used for dispatching the malfunction report or to a different connection. If the malfunction relates to the currently used TK connection, the reporting TK subscriber is not explicitly required to enter the complete dial number since it is already known to the IN service as a result of the present connection set-up.

The IN service will determine advantageously from the established connection dial number of the malfunctioning connection the network operator responsible for the connection by means of a database query.

To permit further processing of the malfunction report by the network operator involved, the IN service will deliver the malfunction call to a malfunction reception point of the responsible network operator. It is also feasible to transfer the malfunction call to a different department in the area of the responsible network operator, which in turn will process the call internally as a function of the requirements and the form of the individual network operator.

An advantageous further development provides for the IN service to translate the malfunction dial number dialed by the reporting TK subscriber into the dial number of the malfunction reception point of the responsible network operator by completing it according to the method of number portability (=NP).

Alternatively, the IN service can translate the malfunction dial number dialed by the reporting TK subscriber into the dial number of the malfunction reception point of the responsible network operator in that it completes it according to the method for inter-network operator selection.

In both cases, call-forwarding mechanisms available within and between subnetworks can be used.

Particularly preferred is a variant of the inventive method, wherein the IN service assigns an identification number to the malfunction report, which it on the one hand stores and on the other hand provides to the reporting TK subscriber so that he can inquire subsequently about the current processing status of the malfunction report. It is thereby advantageous if the identification number comprises the dial number of the malfunctioning connection so that the correct location can be prompted automatically when the subscriber calls back.

In a further advantageous development, the reporting TK subscriber, when inquiring about the current processing status of the malfunction report, first dials the malfunction dial number and then selects the identification number, after which the desired information is played to him.

A further advantageous variant of the method is distinguished in that it provides for a database to receive information from all network operators on the current processing status of incoming malfunction reports and that the reporting TK subscriber, on selecting the identification number, receives the desired information on the malfunction reported by him from the database. This makes it possible to forward automatically the corresponding information to the inquiring TK subscriber without the need for any personnel.

Particularly preferred is also a variant, wherein the IN service selects from a number of available automatic announcements the one that is applicable to the current processing status of a specific malfunction when the corresponding identification number is selected and plays it to the calling TK subscriber.

Operation and administration of the central IN service can be carried out advantageously by a service provider in the TK network. This makes it possible for a third party, as a paid service provider, to assume the tasks of the central malfunction reception point and to allocate and forward malfunction reports to the network operator involved. This eliminates, in particular, any possible jurisdictional disputes among the individual network operators.

Further advantages of the invention will become evident from the description and the drawing. The aforementioned characteristics and those described below may be used according to the invention either separately by themselves or in any desired combination. The embodiments shown and described are not to be understood as a definitive enumeration, but are of an exemplary character for the purpose of illustrating the invention.

BRIEF DESCRIPTION OF THE DRAWING

The invention is depicted in the drawing and explained in further detail by means of exemplary embodiments.

The FIGURE shows a schematic organization diagram for implementing the method according to the invention.

SUMMARY OF THE INVENTION

The FIGURE shows the following situation:

A TK network comprises at least two sub-networks 1 and 2, respectively, which are operated by different network operators A and B. A connection 3 to subnetwork network 1 is malfunctioning. A TK subscriber 7 wants to report this malfunction and dispatches the malfunction report using a connection 4 in sub-network 2. The malfunctioning connection 3 and the connection 4 used to report the malfunction may be very remote from each other.

The malfunction report (a) is first routed via partial network 2 of network operator B whose malfunction reception point 6, however, is not responsible for the malfunction of connection 3. The malfunction report (a) is therefore forwarded to a central IN service 8 communicating with all sub-networks 1, 2 and comprising a service control point (=SCP) 9 as well as a database 10 that is connected thereto and contains data from all sub-networks 1, 2.

The IN service 8 first queries reporting TK subscriber 7 on connection 4 through query (c) whether the malfunction report (a) relates to the currently used connection 4 or to a different connection. Since in this case it is not the currently used connection 4 but connection 3 that is malfunctioning, IN service 8 uses a database query (d) to determine the network operator A of sub-network 1, which is responsible for the malfunctioning connection 3. Based on this allocation, IN service 8 now causes forwarding (e) of the malfunction report (a) from sub-network 2 of network operator B to sub-network 1 of the responsible network operator A, which in turn forwards the call to malfunction reception point 5 established for its sub-network 1, which then processes the malfunction report and arranges for the malfunction to be corrected.

The embodiment of IN service 8 for allocating a malfunction report (a) to the responsible network operator A is thus implemented in such a way that network operator A responsible for the reported malfunction can be determined independent of the network responsibility of the calling connection 4.

Specifically, the sequence may be as follows:

a) TK subscriber 7 dials the uniform dial number (currently valid and forthcoming in Germany: 0117S; whereby DT AG is currently planning for S: 0 for night inquiries, 1 for private customers, 2 for business customers, . . . ) for the malfunction reception of all operators. This dial number causes central IN service 8 to activate "malfunction reception."

b) IN service 8 initiates the playing of an announcement prompting identification of the malfunctioning dial number, e.g.: "Please enter the area code+dial number of the malfunctioning connection" or "if you are reporting a malfunction in the connection from where you are calling, if no press 1 . . . ".

c) The TK subscriber 7 selects (e.g., by using a multi-frequency selection process) "area code+dial number" or "1."

d) Network operator A of the malfunctioning connection 3 is determined by means of a database query.

e) The call is transferred to the malfunction reception point 5 of the involved network operator A. There the call is received and processed.

The call can be transferred as follows: The TK subscriber 7 selects a uniform dial number for the malfunction reception point; the malfunction reception point dial number selected by the subscriber can be translated as follows into the dial number for the malfunction reception point S that is specific to the network operator:

1. The number is completed according to the number portability (NP) method; the mechanisms available within and between the networks for realizing NP are used.
2. The number is completed according to the method for inter-network operator selection; the mechanisms available within and between the networks are used.
3. Other mechanisms available within and between the networks may also be used.

To make it possible for TK subscriber 7 to inquire subsequently on the current status of the malfunction report, he is given an identification number when he reports the malfunction. With this identification number, an inquiry may be made as follows:

f) TK subscriber 7 dials the uniform dial number for the central malfunction reception point of all operators A, B.

g) He then selects the identification number. Database 10 knows the current status of the work for correcting the malfunction. Announcements in the networks of all operators are used to inform the subscribers on the status of the work.

h) Database 10 gives sub-network 1 of operator A an identification number of an announcement, which is to be supplied to subscriber 7 for his information.

i) If subscriber 7 wants to be connected to malfunction reception point 5, he can now select a special identification.

What is claimed is:

1. A method for processing malfunction reports in a telecommunications (TK) network with a plurality of sub-networks (1, 2) of different network operators (A, B), wherein at least one IN (Intelligent Network) service (8) is established, which can be activated by dialing a malfunction dial number from any network connection (3, 4), which upon receipt of a malfunction report, independent of the connection (4) dispatching the malfunction report, determines to which connection dial number the malfunction report relates, thereby determining the network operator (A) to whose sub-network (1) the corresponding malfunction belongs, and which delivers the malfunction call to the responsible network operator (A).

2. A method according to claim 1 characterized in that a central IN service (8) is established for the central allocation of malfunction reports within the TK network.

3. A method according to claim 1 characterized in that the IN service (8) can be activated via a sub-network independent malfunction dial number which is uniform for all network operators (A, B).

4. A method according to claim 3 characterized in that the uniform malfunction dial number is differentiated by a special identification digit or digit group according to specific user groups of at least one of business customers and private customers.

5. A method according to claim 3 characterized in that the uniform malfunction dial number is differentiated by a special identification digit or digit group according to specific modalities selected from the group consisting of day inquiries and night inquiry inquiries.

6. A method according to claim 1 characterized in that the IN service (8) upon activation initiates an automatic announcement which is played to the TK subscriber (7) dispatching the malfunction report and prompts him to identify the dial number of the malfunctioning connection (3).

7. A method according to claim 6 characterized in that a computer assisted voice recognition device is activated together with the automatic announcement, which determines the dial number of the malfunctioning connection (3) from the answers of the reporting TK subscriber (7).

8. A method according to claim 6 characterized in that the announcement prompts the TK subscriber (7) to enter the dial number of the malfunctioning connection (3) using the keypad of his TK terminal.

9. A method according to claim 6 characterized in that the reporting TK subscriber (7) can communicate to the IN service (8), either by voice or by defined actuation of the keypad of his TK terminal, whether the malfunction report relates to the connection currently used for dispatching the malfunction report or to another TK connection.

10. A method according to claim 1 characterized in that the IN service (8) determines from the established dial number of the malfunctioning connection (3) the network operator (A) responsible for this connection (3) by means of a database query.

11. A method according to claim 1 characterized in that the IN service (8) delivers the malfunction call to a malfunction reception point (5) of the responsible network operator (A), which receives the malfunction call for further processing.

12. A method according to claim 11 characterized in that the IN service (8) translates the malfunction dial number dialed by the reporting TK subscriber (7) into the dial number of the malfunction reception point (5) of the responsible network operator (A) by completing it according to the method of number portability (=NP).

13. A method according to claim 11 characterized in that the IN service (8) translates the malfunction dial number dialed by the reporting TK subscriber (7) into the dial number of the malfunction reception point (5) of the responsible network operator (A) by completing it according to the method for inter-network operator selection.

14. A method of claim 1 characterized in that the IN service (8) assigns an identification number to the malfunction report, which the IN service (8) stores which the IN service (8) communicates to the reporting TK subscriber (7) so that the subscriber can subsequently inquire about the current processing status of the malfunction report.

15. A method according to claim 14 characterized in that the identification number comprises the dial number of the malfunctioning connection (3).

16. A method according to claim 14 characterized in that the reporting TK subscriber (7), upon inquiry regarding the current processing status of the malfunction report, is first played the malfunction dial number, then selects the identification number, and is subsequently played the desired information.

17. A method according to claim 14 characterized in that a database (10) is provided which comprises the information of all network operators (A, B) regarding the current processing status of received malfunction reports and that the reporting TK subscriber (7), on selecting the identification number, receives the desired information on the reported malfunction from the database (10).

18. A method according to claim 14 characterized in that the IN service (8) selects from a number of available automatic announcements the one that is appropriate for the present processing status of a specific malfunction upon selection of the corresponding identification number and plays it to the calling TK subscriber (7).

19. A method according to claim 2 characterized in that the central IN service (8) is operated and administered by a service provider in the TK network.

* * * * *